Patented Aug. 21, 1934

1,971,029

UNITED STATES PATENT OFFICE

1,971,029

BASIC LEAD SALTS OF 3-5 DINITROBENZOIC ACID

Willi Brün, Crefeld, Germany, assignor to Remington Arms Company, Inc., a corporation of Delaware No Drawing. Application June 3, 1931,
Serial No. 541,945

4 Claims. (Cl. 260—11)

The present invention comprises the discovery of certain new chemical compounds identified as basic lead salts of 3-5 dinitrobenzoic acid. These compounds are deficient in oxygen, burning quite readily in the air, and due to this quality they may be considered to be of the nature of chemical fuels.

The 3-5 dinitrobenzoic acid and certain of its salts are already known. The salts comprised within the purview of this invention are the mono-basic and di-basic lead salts. The mono-basic lead salt has been made as follows:

Into a solution of 3.5 grams of lead nitrate in 100 c. c. of water at a temperature of 70° C. is dropped a mixed solution of 2.12 grams of 3-5 dinitrobenzoic acid and .8 gram of sodium hydroxide in 100 c. c. of water. The lead nitrate solution is constantly stirred while the mixed solution is added, and the stirring is continued thereafter for about 5 minutes at the same temperature. The mixture is then allowed to cool to room temperature, while being stirred, after which the precipitate is filtered off and washed with water. The precipitate is a substantially white and rather fluffy amorphous substance, practically insoluble in cold water and slightly soluble in hot water. Its electro-static properties are very pronounced; a small quantity will cling with great tenacity to a sheet of paper or other non-conductive substance. It contains 47.9% by weight of lead, this analysis conforming quite closely to the theoretical lead content (47.6%) of the mono-basic lead salt of 3-5 dinitrobenzoic acid $$(C_6H_3(NO_2)_2COOPbOH),$$

which may be written structurally as:

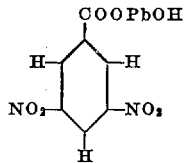

A second and more basic lead salt of 3-5 dinitrobenzoic acid has been made as follows:

Into a solution of 10.5 grams of lead nitrate in 200 c. c. of water is dropped a mixed solution of 4.24 grams of 3-5 dinitrobenzoic acid and 2.4 grams of sodium hydroxide in 200 c. c. of water. The operations of stirring, cooling, filtering and washing, are substantially similar to those described in connection with the preparation of the mono-basic salt. The precipitate in this case is of a cream color, much heavier than the mono-basic salt and without pronounced electro-static properties. It contains 57.8% by weight of lead, which corresponds to the lead content of the di-basic lead salt of 3-5 dinitrobenzoic acid. The theoretical lead content of such di-basic salt is 57.8%, and its formula may be written as $$(C_6H_3(NO_2)_2COO)_2Pb2PbO$$

Both mono-basic and di-basic salts have been found to be extraordinarily useful as fuels for ammunition priming compositions, particularly compositions of the non-corrosive type, certain of which are now available. Mixtures using each of these salts have been prepared and have been found to possess the requisite powder igniting capacity and sensitiveness to blow and, in addition, to present extraordinary resistance to decomposition under severe humidity tests. One example of such a mixture is as follows:

| | |
|---|---:|
| Mercury fulminate | 40.8 |
| Barium nitrate | 24.5 |
| Mono-basic lead dinitrobenzoate | 8.2 |
| Glass | 25.5 |
| Gum | 1. |

The lead salt content of the above mixture may be substantially varied, excellent results having been secured with mixtures containing as low as 6% or as high as 10% thereof, the proportions of the other ingredients being varied accordingly.

Storage for periods up to six weeks in very moist atmosphere at a comparatively high temperature does not appear to have any effect whatever upon the sensitiveness and priming capacity of these mixtures.

The present invention contemplates both the novel basic lead salts of 3-5 dinitrobenzoic acid and the use of such salts as priming mixture ingredients, and the appended claims are to be construed accordingly.

What is claimed is:

1. A basic lead salt of 3-5 dinitrobenzoic acid.
2. A mono-basic lead salt of 3-5 dinitrobenzoic acid of substantially the composition $$C_6H_3(NO_2)_2COOPbOH.$$

3. A lead salt of 3-5 dinitrobenzoic acid having a lead content of not less than 48%.
4. A lead salt of 3-5 dinitrobenzoic acid having substantially the composition $$(C_6H_3(NO_2)_2COO)_2Pb2PbO.$$

WILLI BRÜN.